(12) United States Patent
Conner et al.

(10) Patent No.: US 6,273,567 B1
(45) Date of Patent: Aug. 14, 2001

(54) COMPACT MULTI-PATH LCD PROJECTOR

(76) Inventors: Arlie R. Conner, 5777 SW. Calusa Loop, Tualatin, OR (US) 97062; David K. Booth, 11865 SW. Walnut St., Tigard, OR (US) 97223

(*) Notice: Subject to any disclaimer, the term of this patent is extended or adjusted under 35 U.S.C. 154(b) by 0 days.

(21) Appl. No.: 09/152,760

(22) Filed: Sep. 14, 1998

(51) Int. Cl.[7] .................................................. G03B 21/14
(52) U.S. Cl. ............................ 353/20; 353/31; 353/33; 349/9
(58) Field of Search .......................... 353/8, 20, 31, 353/33, 34, 37, 81; 349/8, 5, 9; 359/490

(56) References Cited

U.S. PATENT DOCUMENTS

| | | | | |
|---|---|---|---|---|
| 5,214,457 | * | 5/1993 | Takanashi et al. | 353/33 |
| 5,365,287 | * | 11/1994 | Vollmer et al. | 353/31 |
| 5,374,968 | * | 12/1994 | Haven et al. | 353/31 |
| 5,389,982 | * | 2/1995 | Lee | 353/20 |
| 5,575,548 | * | 11/1996 | Lee | 353/31 |
| 5,648,870 | * | 7/1997 | Mitsutake | 353/20 |
| 5,653,520 | * | 8/1997 | Kato | 353/33 |
| 5,717,472 | * | 2/1998 | Lee | 349/9 |
| 5,772,299 | * | 6/1998 | Koo et al. | 353/20 |
| 5,798,819 | * | 8/1998 | Hattori et al. | 353/33 |
| 5,826,959 | * | 10/1998 | Atsuchi | 353/20 |
| 5,918,961 | * | 7/1999 | Ueda | 353/20 |
| 5,921,650 | | 7/1999 | Doany et al. | 353/31 |
| 5,946,056 | * | 8/1999 | Ishibashi et al. | 349/9 |

\* cited by examiner

*Primary Examiner*—William Dowling
(74) *Attorney, Agent, or Firm*—Ipsolon LLP

(57) ABSTRACT

A multi-path reflective color liquid crystal display projection system utilizes one color separating dichroic mirror in combination with polarizing beam splitters and reflective liquid crystal displays to provide a high resolution, high brightness display. The dichroic mirror separates two color components (e.g., green and one of the red and blue components) and from the other (e.g., the other of the red and blue components). A color light separating polarizing beam splitter the receives the two selected color components of light and separates them from each other.

41 Claims, 5 Drawing Sheets

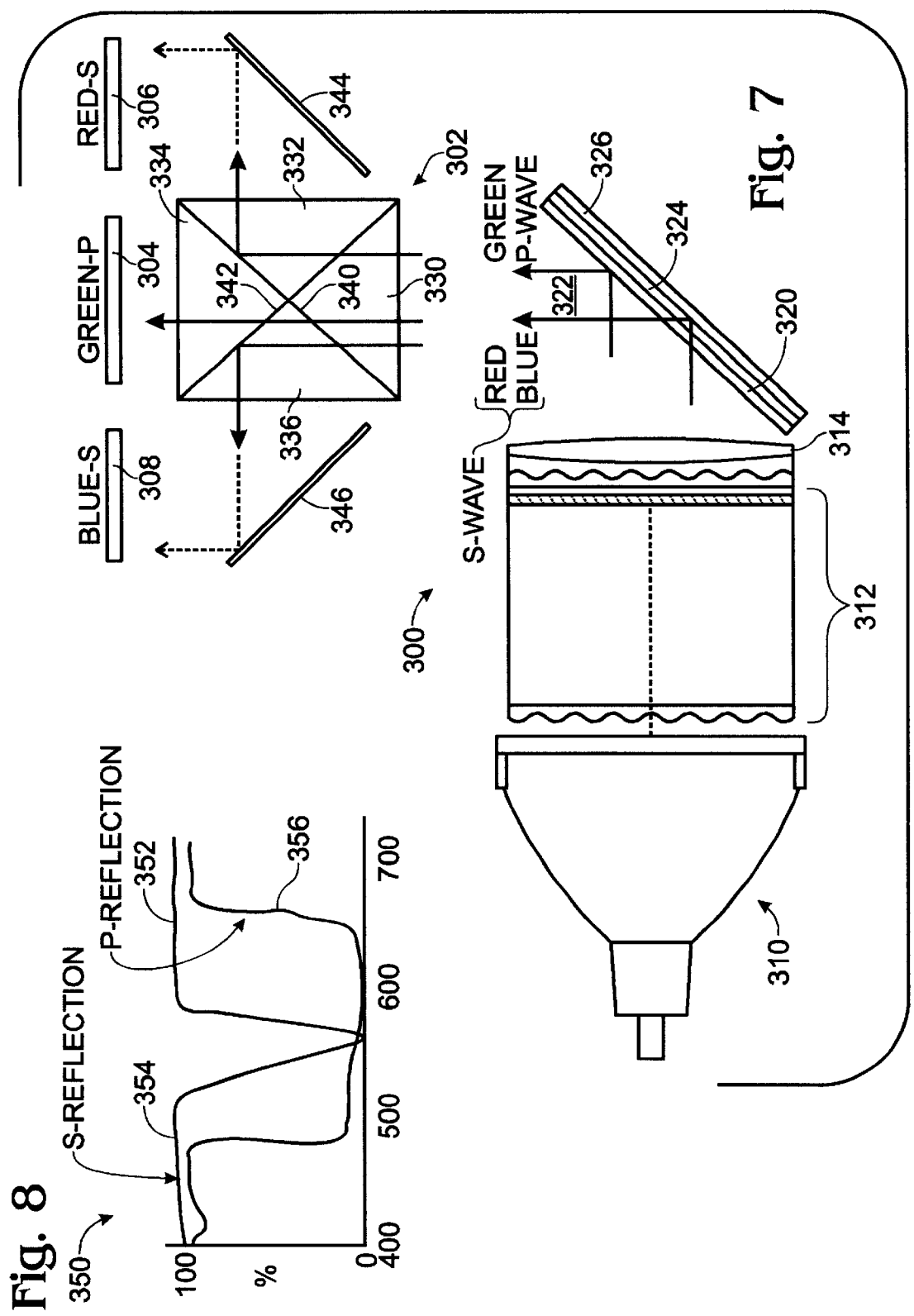

COMPACT MULTI-PATH LCD PROJECTOR

FIELD OF THE INVENTION

The present invention relates to color LCD projectors and, in particular, to such a projector that provides high brightness in a compact form factor.

BACKGROUND AND SUMMARY OF THE INVENTION

Color liquid crystal display projectors generate display images and project them onto display screens, typically for viewing by multiple persons or viewers. The display images may be formed by transmitting light from a high-intensity source of polychromatic or white light through or reflected from an image-forming medium such as a liquid crystal display (LCD).

FIG. 1 is a schematic diagram of a prior art multi-path reflective color liquid crystal display projection system 10 that utilizes color separating mirrors 12R, 12BG, and 12G in combination with polarization selective polarizing beam splitters 14R, 14G, and 14B and reflective liquid crystal displays 16R, 16G, and 16B to provide a high resolution, high brightness display.

Projection system 10 includes a light source 18 that directs white light through a polarizer (or polarization converter) 20 that provides polarized light to a pair of crossed dichroic mirrors 12R and 12BG. Dichroic mirror 12R reflects red light components along a red optical path 22R that is folded by an achromatic fold mirror 24R. Green and blue light passes through mirror 12R. Mirror 12BG reflects blue and green light components along a blue-green optical path 22BG that is folded by an achromatic fold mirror 24BG. Red light passes through mirror 12BG. Mirror 12G reflects green light components along a green optical path 22G and allows the blue light components to propagate along a blue optical path 22B. As a result, mirrors 12R, 12BG, and 12G cooperate to separate polarized red, green and blue light components and deliver them to polarizing beam splitters 14R, 14G, and 14B.

Each polarizing beam splitter 14 includes a pair of right-angle prisms having their inclined faces positioned against each other with a polarization selective dielectric film (not shown) positioned therebetween. As is conventional for polarizing beam splitters, P-polarized light passes through the dielectric film and S-polarized light is reflected. S- and P-polarizations are conventional nomenclature referring to a pair of orthogonal linear polarization states in which, with regard to a polarization selective dielectric film, S-polarized light can be said to "glance" off the film and P-polarized light can be said to "pierce" the film. Polarizer 20 transmits the red, green and blue light components as predominantly S-polarized light, so nearly all the light received by polarizing beam splitters 14R, 14G, and 14B is reflected by the dielectric films to reflective liquid crystal displays 16R, 16G, and 16B.

In one implementation, reflective liquid crystal displays 16 are quarter wave-tuned (i.e., with 45°–60° twists) twisted nematic cells and reflect light from each pixel with a polarization that varies according to the control voltage applied to the pixel. For example, when no control voltage is applied (i.e., the pixel is in its relaxed state), the pixel imparts maximum (i.e., a quarter wave) phase retardation that results in a polarization rotation for suitably aligned polarized light. Each pixel imparts decreasing polarization rotation with increasing control voltage magnitudes until the pixel imparts no rotation (i.e., the pixel is isotropic).

In the relaxed state of a pixel, the polarization state is reversed when the light is reflected, so that the S-polarized light becomes P-polarized light. The P-polarized light then passes through the dielectric film of the polarizing beam splitter toward a crossed-combining prism 26 (also known as an X-cube) to be incorporated into the display image. With non-zero control voltages, the pixel reflects the light with corresponding proportions of P- and S-polarizations. Control voltages of greater magnitudes in this example cause greater portions of the light to be reflected with S-polarization, with all the reflected light having S-polarization at the greatest control voltage. The portion of the light with S-polarization is reflected by the dielectric films in polarizing beam splitters 14 back toward the illumination source and are not incorporated into the display image.

Such a multi-path reflective color liquid crystal display projection system 10 can provide improved imaging characteristics over more conventional projections systems that use transmissive liquid crystal displays. Reflective liquid crystal displays do not suffer from the low transmissivity characteristic of transmissive displays, and hence the relatively low brightness of their projection systems. Moreover, the reflective liquid crystal displays are relatively easier to fabricate and miniaturize than conventional transmissive liquid crystal displays, which can allow lower production costs and smaller, more portable projection systems.

While it may have advantages over conventional transmissive projection systems, such a multi-path reflective color liquid crystal display projection system 10 suffers from disadvantages that impair its imaging characteristics. One of crossed mirrors 12R and 12BG is actually formed with two mirror halves that are positioned behind and in front of the other of mirrors 12R and 12BG. Proper alignment of the mirror halves is very difficult and rarely achieved. As a consequence, the images reflected by the mirror halves are mis-aligned, which can result in readily discernible misalignments in the image halves. The relatively common misalignment between the mirror halves introduces, therefore, generally unacceptable image errors that may appear as ce-coupled image halves that are improperly joined along an apparent seam.

One implementation of a multi-path reflective color liquid crystal display projection system according to the present invention utilizes two color separating mirrors in combination with two polarizing beam splitters and reflective liquid crystal displays to provide a high resolution, high brightness display. The projection system includes a light source that directs white light through a polarization converter that provides S-polarized light to a first angled dichroic mirror. In one implementation, the dichroic mirror reflects two color components (e.g., green and one of the red and blue components) and passes one color component (e.g., the other of the red and blue components). The dichroic mirror provides a one-to-two color separation in which the green light component is reflected with one other light component.

A quarter wave plate and an achromatic mirror are positioned behind and parallel to the dichroic mirror and cooperate to convert the light that passes through the dichroic mirror (e.g., red light) from S-polarization to P-polarization. The P-polarized red light then passes through the dichroic mirror along the same optical path as the S-polarized green and blue color components.

A second angled dichroic mirror directs a selected one of the red blue components (e.g., blue) to a polarizing beam splitter that includes a pair of right-angle prisms having their respective inclined faces positioned against each other with a dielectric film therebetween. The dielectric film in the polarizing beam splitter is polarization-selective and may be achromatic or color-tuned. With a color-tuned dielectric film, the polarizing beam splitter transmits all color components of light other than the selected component (e.g., blue), regardless of polarization, while functioning as a conventional polarizing beam splitter for the selected color (e.g., blue light). Accordingly, the polarizing beam splitter reflects S-polarized blue light toward a reflective liquid crystal display, and any P-polarized blue light passes out of the polarizing beam splitter with the non-blue light (i.e. red or green light).

The remaining color components (e.g., red and green) pass through the second angled dichroic mirror to a second polarizing beam splitter having a pair of right-angle prisms with their respective inclined faces positioned against each other with a dielectric film therebetween. A reflective liquid crystal display is positioned in alignment each of two adjacent sides of the second polarizing beam splitter.

The two color components (e.g., red and green) received at the second polarizing beam splitter are of respective S- and P-polarizations. The S-polarized green light is reflected by the dielectric film to one of the reflective liquid crystal displays, and the P-polarized red light passes through the dielectric film to the other of the reflective liquid crystal displays. The images formed at the three reflective liquid crystal displays are reflected to and combined by a simple combiner formed by a pair of right angle prisms.

The reflective liquid crystal displays are quarter wave-tuned twisted nematic cells and reflect light from each pixel with a polarization that varies according to the control voltage applied to the pixel. For example, the pixel in its relaxed state may have quarter wave retardation and maximum polarization rotation and may have decreasing polarization rotation with increasing control voltage magnitudes up to a maximum control voltage magnitude at which the pixel is isotropic and imparts no polarization rotation.

A second implementation of a multi-path reflective color liquid crystal display projection system according to the present invention utilizes one color separating mirror in combination with polarizing beam splitters and reflective liquid crystal displays to provide a high resolution, high brightness display. This projection system also includes a light source that directs white light through a polarization converter that provides S-polarized light to an angled dichroic mirror. In one implementation, the dichroic mirror reflects two color components (e.g., green and one of the red and blue components) and passes one color component (e.g., the other of the red and blue components).

In this implementation, however, the two reflected color components pass first through a green-tuned polarizing beam splitter. Each of the polarizing beam splitters includes a pair of right-angle prisms having their respective inclined faces positioned against each other with a dielectric film therebetween. Dielectric film in the green-tuned polarizing beam splitter is polarization-selective and functions to transmit all color component light other than green, regardless of polarization, while polarizing beam splitter functions as a conventional polarizing beam splitter for green light. Accordingly, the green-tuned polarizing beam splitter reflects S-polarized green light toward a reflective liquid crystal display, and any P-polarized green light passes with the non-green light (i.e. red or blue light) toward an achromatic fold mirror. The remaining two polarizing beam splitters each receive one of the red and blue light components with an S-polarization. These polarizing beam splitters reflect the S-polarized red or blue light toward respective reflective liquid crystal displays.

The multi-path reflective color liquid crystal display projection systems of this invention provides improved imaging characteristics over more conventional projection systems that use transmissive liquid crystal displays. Reflective liquid crystal displays do not suffer from the low aperture ratios characteristic of transmissive displays, and hence the relatively low brightness of their projection systems. Moreover, the reflective liquid crystal displays are relatively easier to fabricate and miniaturize than conventional transmissive liquid crystal displays, which can allow lower production costs and smaller, more portable projection systems.

In addition, this multi-path reflective color liquid crystal display projection system includes fewer optical elements and overcomes poor imaging characteristics of prior multi-path reflective color liquid crystal display projection systems (e.g., FIG. 1). This projection system eliminates one of the three polarizing beam splitters and the "crossed" dichroic mirrors. The crossed mirrors are actually formed with three mirrors, one whole mirror and two mirror halves that are positioned behind and in front of the whole mirror. Proper alignment of the mirror halves is very difficult and rarely achieved. As a consequence, the images reflected by the mirror halves are mis-aligned, which can result in readily discernible mis-alignments in the image halves. Elimination of the crossed mirrors prevents the misalignment between image halves characteristic of imaging systems with crossed mirrors.

Furthermore, this projection system provides increased compactness and simplicity over prior reflective color liquid crystal display projection systems by incorporating color separating functionality into the green polarizing beam splitter rather than having a pair of crossed dichroic mirrors. This integrated functionality in polarizing beam splitter allows elimination of two of the three dichroic mirrors and one of the two achromatic fold mirrors in prior projection systems. Elimination of these components reduces the overall cost of projector system and provides a shortened optical system that allows projector system to be even smaller and more portable than prior systems.

Additional objects and advantages of the present invention will be apparent from the detailed description of the preferred embodiment thereof, which proceeds with reference to the accompanying drawings.

BRIEF DESCRIPTION OF THE DRAWINGS

FIG. 7 is a schematic diagram of an alternative projection display system employing transmissive liquid crystal displays.

FIG. 8 is a graph illustrating approximate reflectance characteristics of dielectric films included in a polarizing beam splitter of the diplay system of FIG. 7.

DETAILED DESCRIPTION OF PREFERRED EMBODIMENTS

Figure 2:
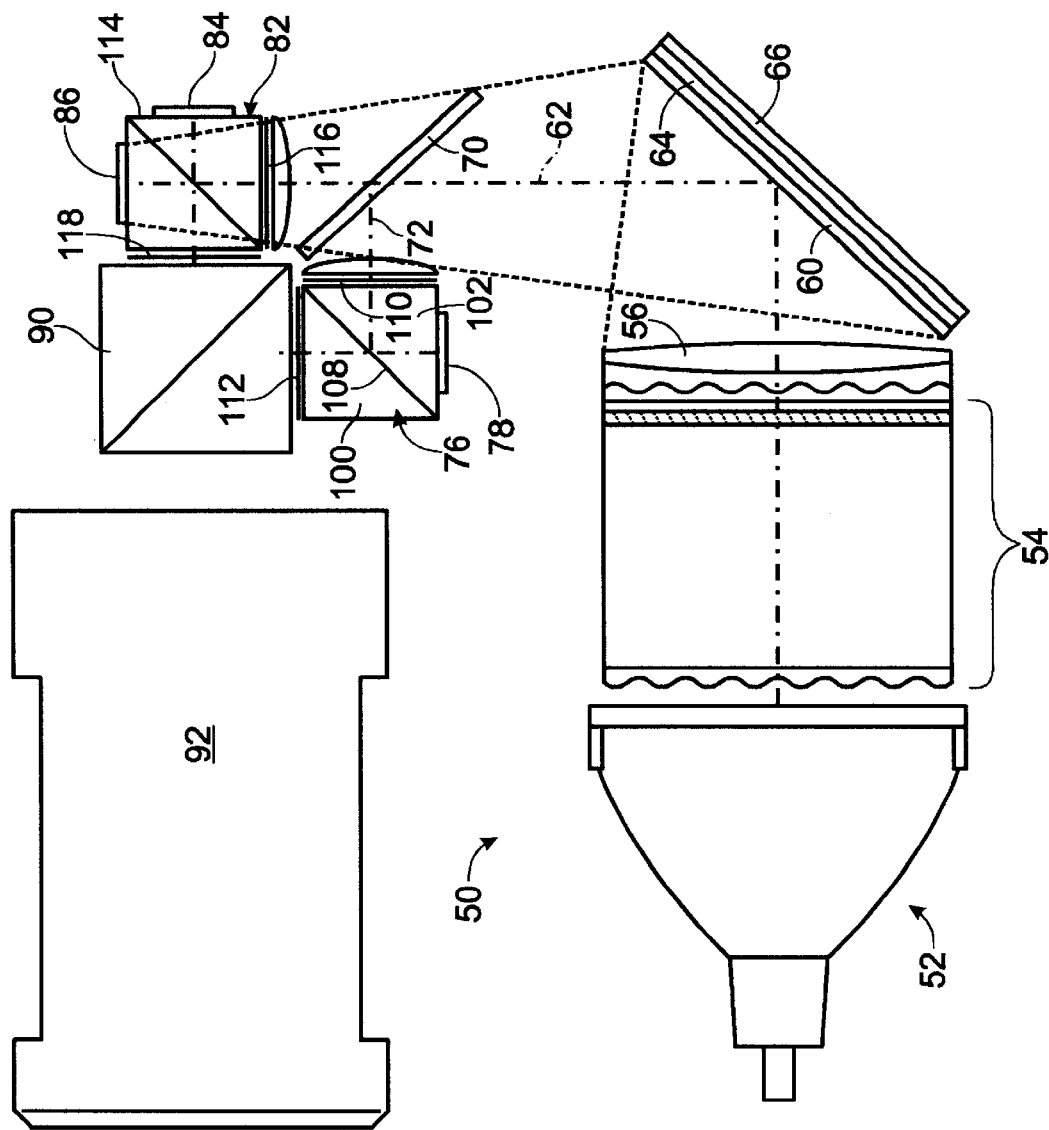
FIG. 2 is a schematic diagram of a multi-path reflective color liquid crystal display projection system according to the present invention.

FIG. 2 is a schematic diagram of a multi-path reflective color liquid crystal display projection system 50 according to the present invention. Projection system 50 includes a light source 52 (e.g., a metal halide arc lamp and a concave concentrating reflector) that directs white light through a polarization converter 54 and a condenser lens assembly 56. For example, polarization converter 54 may be a generally lossless plane polarization converter as are known in the art or as described in copending application Ser. No. 08/920,359, filed Aug. 29, 1997 for High Efficiency Polarizing Converter, and assigned to the assignee of the present application.

Polarization converter 54 provides polarized light (e.g., S-polarized) to a dichroic mirror 60 that reflects two color components. In the illustrated implementation, mirror 60 transmits red light components and reflects blue and green light components along an optical path 62. In an alternative implementation, mirror 60 transmits blue light components and reflects red and green light components along optical path 62. In both implementations, dichroic mirror 60 provides a one-to-two color separation in which the green light component is reflected with one other light component. The green light is reflected in both implementations because green light is between red and blue light in the spectrum.

Positioned behind and parallel to dichroic mirror 60 are a quarter wave plate 64 and an achromatic mirror 66. Mirror 66 may be a front surface mirror. Alternatively, mirror 66 may be a cold mirror that transmits heat (i.e. infrared radiation) to prevent the heat from reaching other optical components (e.g., liquid crystal displays). In the illustrated implementation, red light passes through dichroic mirror 60. Quarter wave plate 64 converts the S-polarized light to a circularly polarization of a first rotational sense, and reflection of the circularly polarized red light from mirror 66 reverses the polarization sense (i.e., direction) of the red light. The red light again passes through quarter wave plate 64, which converts the reversed circularly polarized light to P-polarization. The red light then passes through dichroic mirror 60 and along optical path 62.

Dichroic mirror 60 cooperates with quarter wave plate 64 and achromatic mirror 66 to reverse the polarization sense of one color component of light (i.e., red) relative to the other two color components. It will be appreciated that in other implementations, the polarization of blue light could be reversed relative to red and green light. Alternatively, the polarizations directions or senses of two color components could be reversed relative to the remaining one component.

A second angled dichroic mirror 70 directs either blue or red light (e.g., blue light) along an optical path 72 to separate that color component from the other two color components. The separated color component is directed to a polarizing beam splitter 76 with an associated quarter wave-tuned reflective liquid crystal display 78. Polarizing beam splitter 76 includes a pair of right-angle prisms 100 and 102 having their respective inclined faces positioned against each other with a dielectric film 108 therebetween. Dielectric film 108 is polarization selective and may be achromatic or a color-tuned which, in the latter implementation, transmits all color component light other than blue, regardless of polarization, while the polarizing beam splitter functions as a conventional polarizing beam splitter for blue light.

Accordingly, polarizing beam splitter 76 reflects S-polarized blue light toward reflective liquid crystal display 78. Incidental P-polarized blue light passes out of polarizing beam splitter 76 and is discarded as potential illumination contamination. With a color-tuned dielectric film, any incidental non-blue light (i.e. red or green light) also passes out of polarizing beam splitter 76 and is discarded. Polarization converter 54 transmits predominantly S-polarized light, so nearly all the blue light received by polarizing beam splitter 76 is reflected to reflective liquid crystal display 78.

Reflective liquid crystal display 78 is a quarter wave-tuned twisted nematic cell that reflects light from each pixel with a polarization that varies according to the control voltage applied to the pixel. Hence, liquid crystal display 78 imparts image information on the color components of light. In one implementation, liquid crystal display 78 is formed on polysilicon substrates, as is known in the art. For example, the pixel in its relaxed state may have quarter wave retardation and maximum polarization rotation and may have decreasing polarization rotation with increasing control voltage magnitudes up to a maximum control voltage magnitude at which the pixel is isotropic and imparts no polarization rotation.

In the relaxed state, the polarization state is reversed when the light is reflected, so that the S-polarized light becomes P-polarized light. The P-polarized light then passes through the dielectric film 108 of the polarizing beam splitter 76 toward a combiner 90 to be incorporated into the display image. With non-zero control voltages, the pixel reflects the light with corresponding proportions of P- and S-polarizations. Greater control voltages in this example cause greater portions of the light to be reflected with S-polarization. The portion of the light with S-polarization is reflected by the dielectric films in polarizing beam splitter 76 back toward the illumination source and is not incorporated into the display image. As a result, polarizing beam splitter 76 functions to analyze the image information imparted on the light by liquid crystal display 78.

Some incidental P-polarized light entering polarizing beam splitter 76 is sometimes reflected at dielectric film 108 toward reflective liquid crystal display 78, rather than passing through dielectric film 108 as is desired. This P-polarized light can degrade image contrast when the P-polarized light is reflected from liquid crystal display 78, passes back through dielectric film 108, and is incorporated into the display image. It is believed that the reflection of such P-polarized light occurs when the light has an angle of incidence that deviates from a preferred normal angle, but other causes are possible. To prevent such image contrast degradation that can be caused by such P-polarized light, a linear polarizing filter 110 (e.g., a stretched and dyed or iodine-type) can be positioned to block P-polarized light directed toward polarizing beam splitter 76. To further enhance image contrast, another polarizing film 112, such as a dichroic dyed and stretched polyvinyl alcohol (PVA) type, can be positioned between polarizing beam splitter 76 and combiner 90 to block light other than P-polarized blue light.

The remaining two color components (i.e., red and green), pass through dichroic mirror 70 to a second polarizing beam splitter 82 having a pair of associated quarter wave-tuned reflective liquid crystal displays 84 and 86 positioned at adjacent sides. Polarizing beam splitter 82 is of the same configuration as polarizing beam splitter 76, including having a dielectric film (not shown). The dielectric film may be color tuned or "achromatic," as is more conventional for polarizing beam splitters, so that all colors of S-polarized light are reflected.

The green light at polarizing beam splitter 82 is S-polarized, and the red light is P-polarized. Accordingly, the dielectric film of polarizing beam splitter 82 reflects the S-polarized green light toward reflective liquid crystal display 84. The P-polarized red light passes through the dielectric film toward reflective liquid crystal display 86. Reflective liquid crystal displays 84 and 86 are the same as liquid crystal displays 78. Liquid crystal displays 78, 84, and 86 cooperate with polarizing beam splitters 76 and 82 to direct image light components to combiner 90 along path lengths that are the same for each color component of light. A benefit of such equal path lengths is that they enhance equal brightness and uniformity profiles on liquid crystal displays 78, 84, and 86. With image information being provided from only two sources (i.e. polarizing beam splitters 76 and 82), combiner may be formed as a pair of right angle prisms with their inclined faces joined together with a single color edge dichroic reflector (e.g., the same color as dichroic mirror 70). Such a combiner 90 is simpler and less expensive than is the X-cube combiner of some prior systems, providing projection system 50 with yet another cost benefit. Combiner 90 passes the image light to a projection lens assembly 92, which projects the combined image toward a display screen (not shown).

The different polarizations of light at polarizing beam splitter 82 allow it to separate the color components (e.g. red and green) based on their polarizations alone. Prior multi-path reflective projection systems required a separate polarizing beam splitter for each color component of light and transmitted only one color component through each polarizing beam splitter. As a consequence, these prior systems required more optical components to achieve color separation that was distinct from the display image analysis provided by the polarizing beam splitters.

In contrast, projection system 50 utilizes polarization differences in polarizing beam splitter 82 to separate a pair of color light components. Polarizing beam splitter 82 can achieve this color separation whether its dielectric film is color selective or not. This color separation is facilitated by rotating the polarization of one color component relative to another (e.g., red in the illustrated implementation). Polarization system 50 achieves such polarization rotation compactly and efficiently with the combination of color selective (dichroic) mirror 60, quarter wave plate 64, and achromatic mirror 66.

In another implementation of projection system 50, dichroic mirror 60 transmits green light components and reflects red and blue light components, which results in S-polarized red and blue components and P-polarized green components propagating along optical path 62. Dichroic mirror 70, polarizing beam splitter 76 and liquid crystal display 78 operate in the manner described above for S-polarized blue light. In this implementation, however, the dielectric film of polarizing beam splitter 82 reflects the S-polarized red light toward reflective liquid crystal display 84. The P-polarized green light passes through the dielectric film toward reflective liquid crystal display 86.

Some incidental P-polarized light entering polarizing beam splitter 82 is sometimes reflected at the dielectric film toward liquid crystal display 84, rather than passing through the dielectric film 108 toward liquid crystal display 86 as is desired. This P-polarized light can degrade image contrast when the P-polarized light is reflected from liquid crystal display 84, passes back through the dielectric film, and is incorporated into the display image. To prevent such image contrast degradation that can be caused by P-polarized green light, a red color filter 114 (e.g., a Hoya 0-59 type, as is known in the art) can be positioned between polarizing beam splitter 82 and liquid crystal display 84 to absorb green light directed toward liquid crystal display 84. To prevent image contrast degradation that can be caused by incidental P-polarized red light, a cyan linear polarizing filter 116 (e.g., a stretched and dyed-type) can be positioned in front of polarizing beam splitter 82 to block P-polarized red light. To further enhance image contrast, another polarizing film 118, such as a dichroic dyed and stretched polyvinyl alcohol (PVA) type, can be positioned between polarizing beam splitter 82 and combiner 90 to block light other than P-polarized red light and S-polarized green light.

It will also be appreciated that the implementations of projection system 50 described above are merely illustrative and that another aspect of this invention is the flexibility it allows optical system designers. The color components may be separated and polarized many different ways.

For example, dichroic mirror 70 could reflect green light toward polarizing beam splitter 76 and transmit red and blue light of different polarizations toward polarizing beam splitter 82. With green light being the majority of light (e.g., about 80 percent), filters 110 and 112 can be optimized for green light and filters 114–118 can exploit the wide band separation between red and blue to provide improved filtering and hence image contrast.

As another example, the illustrated implementation rotated the polarization of one color component relative to the other two. In one variation of this invention, the polarizations of two color components (e.g., red and blue) could be rotated utilizing a suitable color selective (dichroic) mirror 60. The resulting P-polarized blue light could then be separated from the red and green light by a blue color selective mirror 170. With liquid crystal display 78 moved from the location shown to the side of polarizing beam splitter 76 opposite mirror 70, the P-polarized blue light would pass through dielectric layer 108 to the newly positioned liquid crystal display 78.

As yet another example of a variation, combiner 90 could reflect the red and green light passing from polarizing beam splitter 82 and to transmit the blue light from polarizing beam splitter 76, thereby allowing projection lens assembly to be positioned opposite polarizing beam splitter 76 rather than beam splitter 82. As yet other examples of possible variations, the blue and green color components could be directed to polarizing beam splitter 82 while the red color component is directed to polarizing beam splitter 76.

It will also be appreciated that this implementation of reflective liquid crystal display 76 is merely illustrative. Reflective liquid crystal display 76 may operate over any range of control voltages, including having only non-zero control voltages, and that the relationships between isotropic and relaxed states may be inverted relative to control voltages. For example, liquid crystal display 76 may be a tunable birefringent liquid crystal display or any other suitable pixelated reflective display whether or not liquid crystals are employed.

Figure 3:
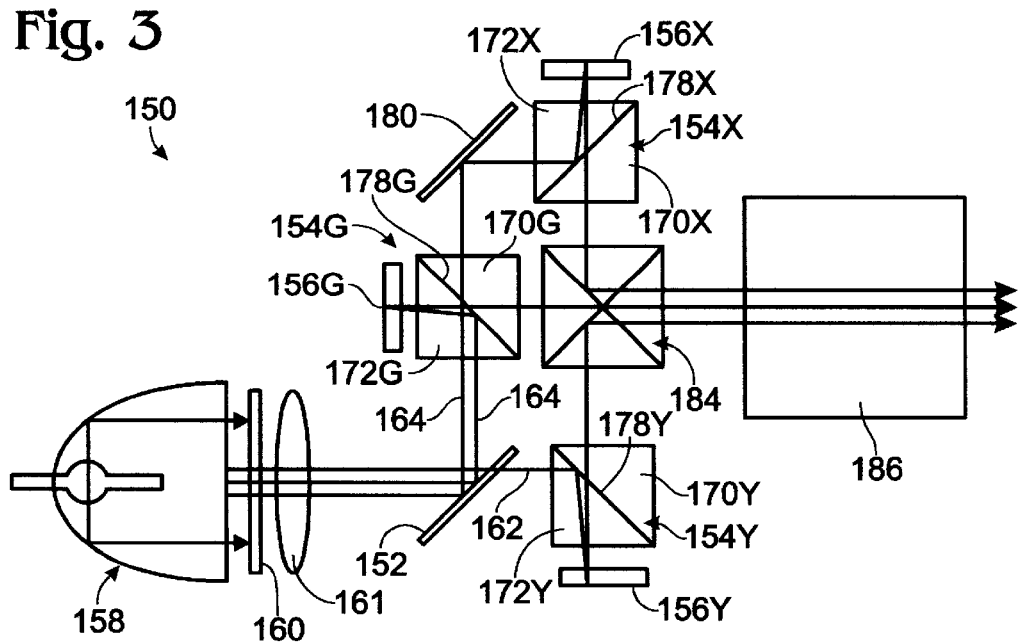
FIG. 3 is a schematic diagram of an alternative multi-path reflective color liquid crystal display projection system according to the present invention.

FIG. 3 is a schematic diagram of a multi-path reflective color liquid crystal display projection system 150 according to the present invention. Projection system 150 utilizes one color separating mirror 152 in combination with polarizing beam splitters 154G, 154X and 154Y and reflective liquid crystal displays 156G, 156X, and 156Y to provide a high resolution, high brightness display.

Projection system 150 includes a light source 158 (e.g., a metal halide arc lamp and a concave concentrating reflector) that directs unpolarized white light through a polarization converter 160 and a condenser lens assembly 161. For example, polarization converter 160 may be a generally lossless plane polarization converter as are known in the art or as described in copending application Ser. No. 08/920, 359, filed Aug. 29, 1997 for High Efficiency Polarizing Converter, and assigned to the assignee of the present application. Polarization converter 160 provides polarized light to dichroic mirror 152 that reflects two color components. In one implementation, mirror 152 transmits red light components along a transmissive optical path 162 and reflects blue and green light components along a reflective optical path 164. In another implementation, mirror 152 transmits blue light components along transmissive optical path 162 and reflects red and green light components along reflective optical path 164. In both implementations, dichroic mirror 152 provides a one-to-two color separation in which the green light component is reflected with one other light component. The green light is reflected in both implementations because green light is between red and blue light in the spectrum.

Each polarizing beam splitter 154 includes a pair of right-angle prisms 170 and 172 having their respective inclined faces positioned against each other with a dielectric film 178 therebetween. Dielectric film 178G in polarizing beam splitter 154G is a color-tuned and functions to transmit all color component light other than green, regardless of polarization, while functioning as a conventional polarizing beam splitter for green light. Accordingly, polarizing beam splitter 154G reflects S-polarized green light toward reflective liquid crystal display 156G. Any P-polarized green light passes with the non-green light (i.e. red or blue light) of any polarization toward an achromatic fold mirror 180 (e.g., either a front surface mirror or a cold mirror to prevent reflection of heat in the form of infrared radiation). Polarizer 160 transmits predominantly S-polarized light, so nearly all the green light received by polarizing beam splitter 154G is reflected to reflective liquid crystal displays 156G.

Polarizing beam splitters 154X and 154Y each receive one of the red and blue light components with an S-polarization. Polarizing beam splitters 154X and 154Y reflect the S-polarized red or blue light toward reflective liquid crystal displays 156X and 156Y, respectively. Polarizing beam splitters 154X and 154Y may be color-tuned to provide enhanced color filtering of the light components. Polarizing beam splitters 154X and 154Y also may be color non-selective (i.e., white tuned) as are conventional polarizing beam splitters.

Reflective liquid crystal displays 156 are quarter wave-tuned twisted nematic cells and reflect light from each pixel with a polarization that varies according to the control voltage applied to the pixel. Hence, liquid crystal displays 156 impart image information on the color components of light. In one implementation, liquid crystal displays 156 are formed on polysilicon substrates, as is known in the art. For example, the pixel in its relaxed state may have quarter wave retardation and maximum polarization rotation and may have decreasing polarization rotation with increasing control voltage magnitudes up to a maximum control voltage magnitude at which the pixel is isotropic and imparts no polarization rotation.

In the relaxed state, the polarization state is reversed when the light is reflected, so that the S-polarized light becomes P-polarized light. The P-polarized light then passes through the dielectric film 178 of the polarizing beam splitter 154 toward a crossed-combining prism 184 (also known as an X-cube) to be incorporated into the display image.

With non-zero control voltages, the pixel reflects the light with corresponding proportions of P- and S-polarizations. Greater control voltages in this example cause greater portions of the light to be reflected with S-polarization. The portion of the light with S-polarization is reflected by the dielectric films in polarizing beam splitters 154 back toward the illumination source and are not incorporated into the display image. As a result, polarizing beam splitters 154 function to analyze the image information imparted on the light by liquid crystal displays 156. Crossed-combining prism 184 combines the red, green and blue display components into a multi-color image that passes through projection optics 186 to a display screen (not shown).

It will be appreciated that this implementation of reflective liquid crystal displays 156 is merely illustrative. Reflective liquid crystal displays 156 may operate over any range of control voltages, including having only non-zero control voltages, and that the relationships between isotropic and relaxed states may be inverted relative to control voltages. For example, liquid crystal displays 156 may be tunable birefringent liquid crystal displays or any other suitable pixelated reflective display whether or not liquid crystals are employed.

Multi-path reflective color liquid crystal display projection system 150 provides improved imaging characteristics over more conventional projection systems that use transmissive liquid crystal displays. Reflective liquid crystal displays do not suffer from the low transmissivity characteristic of transmissive displays, and hence the relatively low brightness of their projection systems. Moreover, the reflective liquid crystal displays are relatively easier to fabricate and miniaturize than conventional transmissive liquid crystal displays, which can allow lower production costs and smaller, more portable projection systems.

Figure 1:
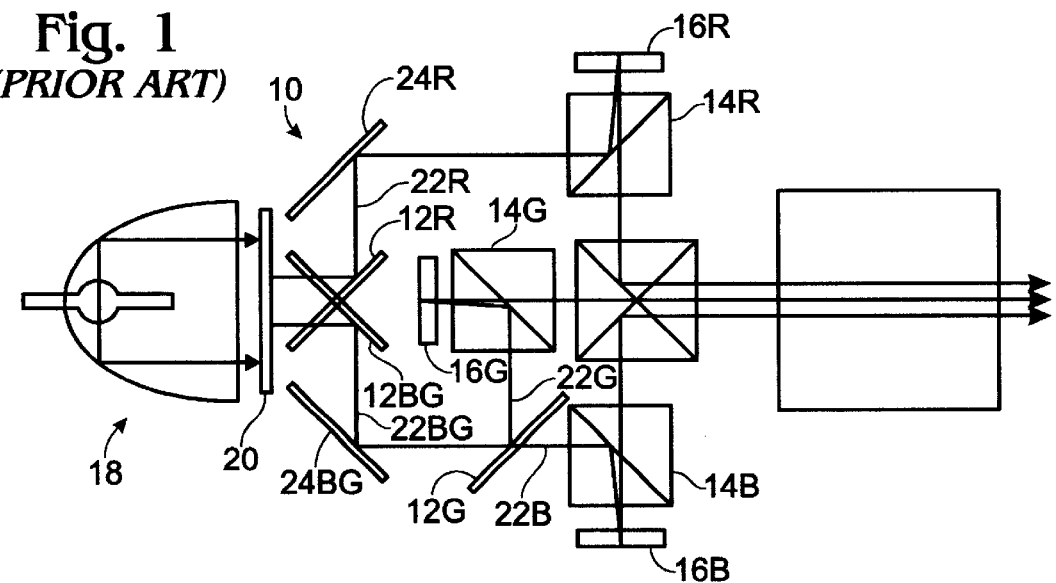
FIG. 1 is a schematic diagram of a prior art multi-path reflective color liquid crystal display projection system.

In addition, multi-path reflective color liquid crystal display projection system 150 overcomes inefficiencies that impair imaging characteristics of prior multi-path reflective color liquid crystal display projection systems (e.g., FIG. 1). Projection system 150 eliminates the "crossed" dichroic mirrors of prior systems.

Furthermore, projection system 150 provides increased compactness and simplicity over prior reflective color liquid crystal display projection systems by incorporating color separating functionality into polarizing beam splitter 154G. This integrated functionality in polarizing beam splitter 154G allows elimination of two of the three dichroic mirrors and one of the two achromatic fold mirrors in prior projection systems. Elimination of these components reduces the overall cost of projector system 150 and provides a shortened optical system that allows projector system 150 to be even smaller and more portable than prior systems.

Figure 4:
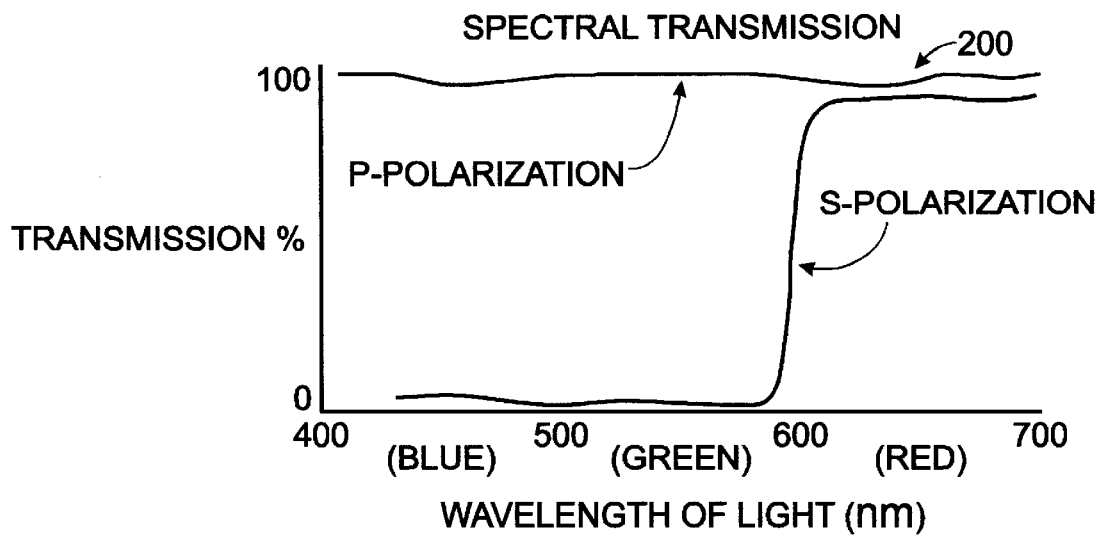
FIGS. 4 and 5 are diagrammatic graphs of the spectral transmission characteristics of a green-tuned polarizing beam splitter when it adapted to transmit red and blue light, respectively.
Figure 5:
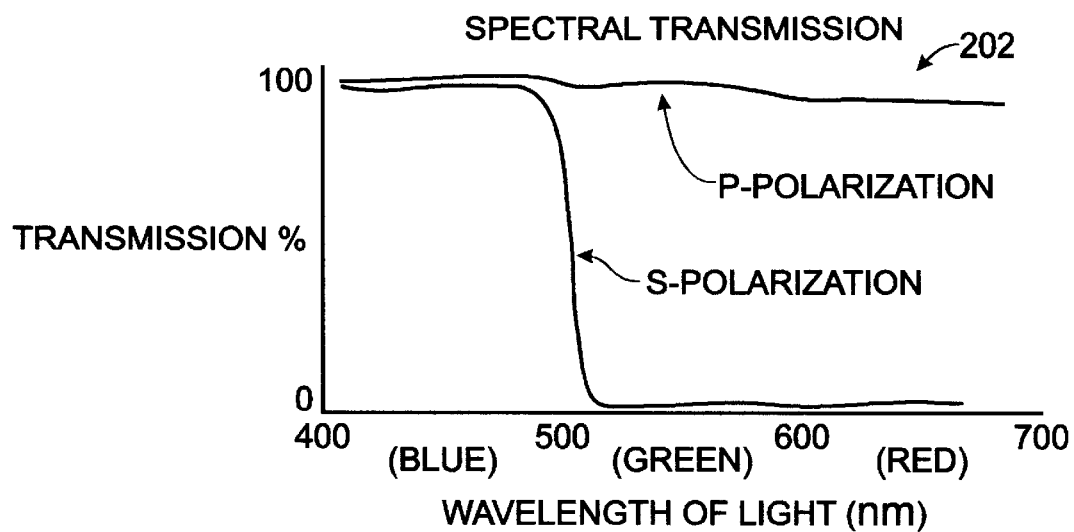

FIGS. 4 and 5 are diagrammatic graphs 200 and 202 of the spectral transmission characteristics of dielectric film 178G in polarizing beam splitter 154G when it transmits red and blue light, respectively, along optical path 164. Graphs 200 and 202 further illustrate the transmission characteristics described hereinabove. Referring to FIG. 4, P-polarized light passes through dielectric film 178G for all wavelengths of light, as is conventional for polarizing beam splitters. S-polarized red light also passes through dielectric film 178G, and blue and green light is reflected. Referring to FIG. 5, P-polarized light passes through dichroic film 178G for all wavelengths of light. S-polarized blue light also passes through dielectric film 178G, and red and green light is reflected.

Figure 6:
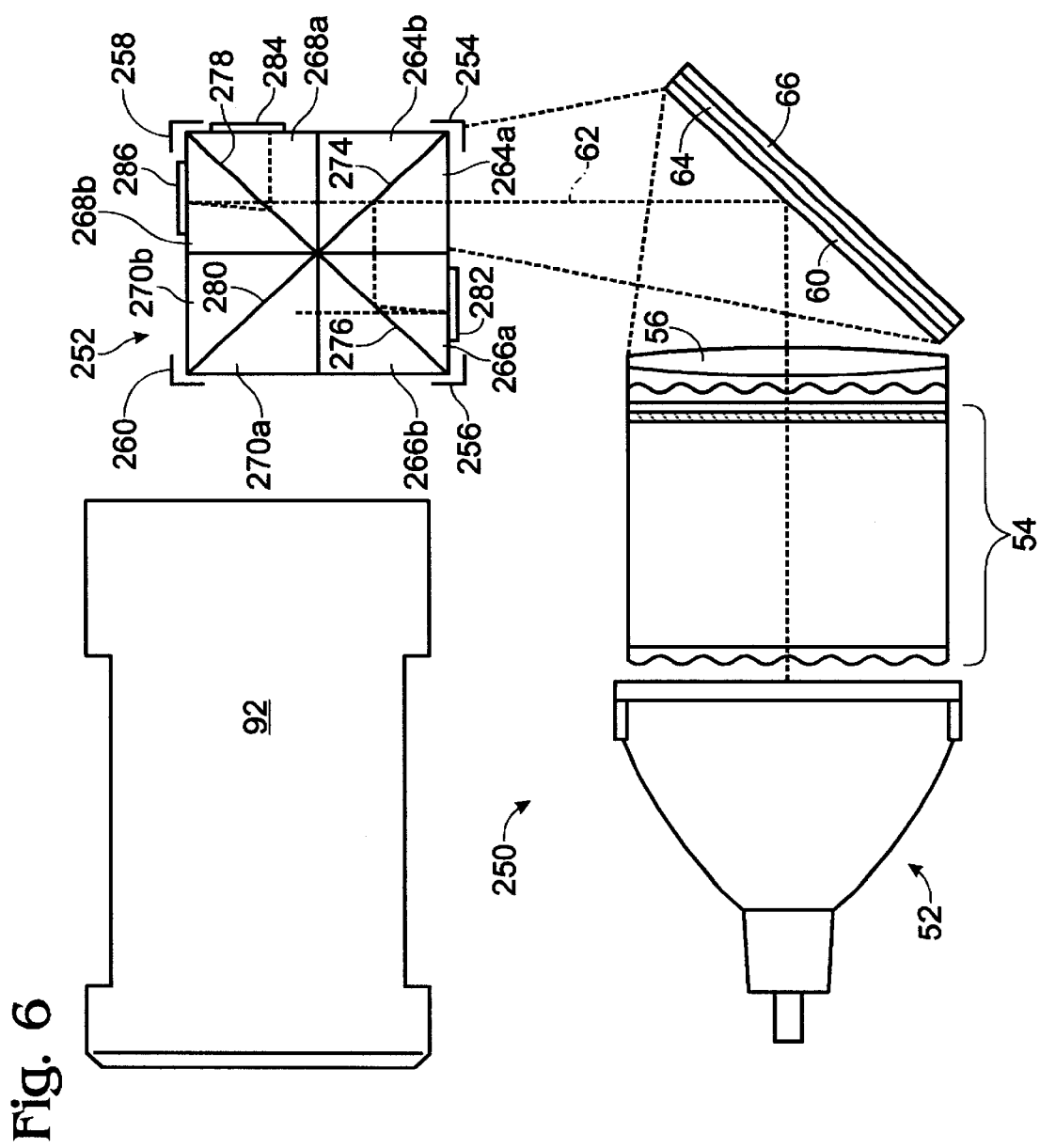
FIG. 6 is a schematic diagram of another alternative multi-path reflective color liquid crystal display projection system according to the present invention.

FIG. 6 is a schematic diagram of another alternative multi-path reflective color liquid crystal display projection system 250 according to the present invention. Projection system 250 is analogous to and includes the same illumination components as projection system 50, but includes an ultra compact and robust multi-prism assembly 252 in substitution for dichroic mirror 70, polarizing beam splitters 76 and 82 and combiner 90. In one implementation, polarizing beam splitter assembly 252 receives P-polarized red light and S-polarized blue and green light along optical path 62.

Multi-prism assembly 252 includes four dual prism sets 254, 256, 258, and 260 that are positioned against each other or in close proximity to each other. Each of dual prism sets 254–260 includes a respective pair of right-angle prisms 264–270 having their respective inclined faces positioned against each other, with dual prism sets 254–260 each including a respective film 274–280 between the inclined faces. Reflective liquid crystal displays 282–286 are positioned adjacent exterior faces of dual prism sets 256 and 258. Dual prism sets 254–260 may be of the same size to fit together compactly and solidly.

With reference to projection system 50, dual prism sets 256, 258, and 260 function in the same way as polarizing beam splitters 76 and 82 and combiner 90, respectively. Films 256 and 258 are dielectric films of the type included in and described with reference to polarizing beam splitters 76 and 82. Film 254 in dual prism set 254 is a dichroic reflector that is the same as dichroic reflector 70 of polarization system 50, and film 280 is a single color edge dichroic reflector that is the same color as film 254. This implementation optionally includes the following additional elements, as described above in greater detail: a blue wavelength input polarizer positioned between prisms 264a and 266a, a neutral or blue light output polarizer positioned between prisms 266b and 270a, crossed red and green (or cyan) input polarizer positioned between prisms 264a and 268a, and crossed red and cyan output polarizer positioned between prisms 268b and 270b.

FIG. 7 is a schematic diagram of an alternative projection display system 300. Projection system 300 is analogous to projection system 50, but includes an ultra compact and robust "x-cube" prism assembly 302 in substitution for dichroic mirror 70, polarizing beam splitters 76 and 82 and combiner 90. Further, projection display 300 differs from projection system 50 by including transmissive pixelated (e.g., liquid crystal) displays 304, 306, and 308 in substitution for reflective displays 78, 84, and 86 of projection system 50.

Projection system 300 includes a light source 310 (e.g., a metal halide arc lamp and a concave concentrating reflector) that directs white light through a polarization converter 312 and a condenser lens assembly 314. For example, polarization converter 312 may be a generally lossless plane polarization converter that provides polarized light (e.g., P-polarized) to a dichroic mirror 320 that reflects one color component. In this illustrated implementation, mirror 320 transmits red and blue light components and reflects P-polarized green light components along an optical path 322. Dichroic mirror 320 provides a one-to-two color separation in which the green light component is reflected and the other light components are transmitted.

Positioned behind and parallel to dichroic mirror 320 are a quarter wave plate 324 and an achromatic mirror 326. Mirror 326 may be a front surface mirror or a cold mirror that transmits heat (i.e. infrared radiation) to prevent the heat from reaching other optical components (e.g., liquid crystal displays). In the illustrated implementation, P-polarized red and blue light passes through dichroic mirror 320. Quarter wave plate 324 converts the P-polarized light to a circularly polarization of a first rotational sense, and reflection of the circularly polarized light from mirror 326 reverses the polarization sense (i.e., direction) of the light. The red and blue light again passes through quarter wave plate 324, which converts the reversed circularly polarized light to S-polarization. The red and blue light then passes through dichroic mirror 320 and along optical path 322. Dichroic mirror 320 cooperates with quarter wave plate 324 and achromatic mirror 326 to reverse the polarization sense of two color components of light (i.e., red and blue) relative to another color component.

As illustrated, prism assembly 302 includes four prisms 330, 332, 334, and 336 positioned in face-to-face relation to each other to form an "x-cube." A polarization selective dielectric film 340 is positioned between facing surfaces of prism pairs 330/336 and 332/334, and a polarization selective dielectric film 342 is positioned between facing surfaces of prism pairs 330/332 and 334/336. As is conventional for polarizing beam splitters, P-polarized light passes through dielectric films 340 and 342 to transmissive display 304. Dielectric film 340 reflects the S-polarized red light toward a fold mirror 344 that directs the red light to transmissive display 306. Dielectric film 342 reflects the S-polarized blue light toward a fold mirror 346 that directs the blue light to transmissive display 308. The color component images passing through transmissive displays 304, 306, and 308 are then directed toward projection optical elements (not shown). It will be appreciated that these color component images are combined into an integrated multicolor image by folding and mixing the color components, as described above and as known in the art.

The S-P-S polarizations of the respective red, green and blue color components allow prism assembly 302 to separate the color components without particular sensitivity to color characteristics of dielectric films 340 and 342. FIG. 8 is a graph 350 illustrating approximate reflectance characteristics of films 340 and 342. Film 340 has an S-polarization reflectance curve 352 showing reflection of mid- to long-wavelengths of light that include red light and some green light. Film 342 has an S-polarization reflectance curve 354 showing reflection of mid- to short-wavelengths of light that include blue light and some green light. A P-polarization reflectance curve 356 shows that P-polarizations of light (i.e., green light in this illustration) are transmitted throughout the range of wavelengths representing green light.

Graph 350 shows that the reflectance characteristics of films 340 and 342 for red and blue may significantly overlap the transmission of P-polarized green wavelengths of light. However, these overlapping color characteristics do not affect the efficiency of prism assembly 302 because the green light is separated by polarization from the red and blue light. As a result, the "edges" between the color components are determined by dichroic mirror 320 and are substantially independent of the color characteristics of dichroic films 340 and 342. A benefit of this independence is that color separating dichroic mirror 320 can be easier to fabricate with precise color characteristics than the two dielectric films 340 and 342 of prism assembly 302, thereby reducing the cost of such a system.

In view of the many possible embodiments to which the principles of our invention may be applied, it should be recognized that the detailed embodiments are illustrative only and should not be taken as limiting the scope of our invention. Rather, the invention includes all such embodiments as may come within the scope and spirit of the following claims and equivalents thereto.

What is claimed is:

1. In a multi-path reflective pixelated display projector having a light source providing multi-color light, plural reflective pixelated displays for imparting image information on color components of the light, plural polarizing beam splitters associated with the reflective pixelated display for analyzing image information imparted by the reflective pixelated displays, and a color component image combiner and image projection lens assembly to combine the image information and project it, the improvement comprising:

a color separating dichroic mirror that separates at least two selected color components of light from another color component of light the at least two selected color components of light having have a first polarization and being directed along an optical path separate from the other color components of light; and a color light separating polarizing beam splitter than receives the at least two selected color components of light and separates them from each other, the polarizing beam splitter including a pair of prisms that have respective inclined faces positioned against each other with a dielectric film therebetween; and a quarter wave plate and an achromatic mirror that cooperate to impart on the other color component of light a second polarization orthogonal to the first polarization.

2. The projector of claim 1 in which one of the color components of light is green light.

3. The projector of claim 1 in which the at least two selected color components of light are directed along an optical path separate from the other color components of light.

4. The projector of claim 1 in which the at least two selected color components of light and the other color components of light are directed along a common optical path.

5. The projector of claim 1 in which one of the separated selected color components is directed toward another of the polarizing beam splitters.

6. The projector of claim 1 in which the color light separating polarizing beam splitter delivers the separated selected color components of light directly to separate reflective liquid crystal displays.

7. The projector of claim 6 in which the separate reflective liquid crystal displays are positioned at adjacent faces of the color light separating polarizing beam splitter.

8. In a multi-path reflective pixelated display projector having a light source providing multi-color light, plural reflective pixelated displays for imparting image information on color components of the light, plural polarizing beam splitters associated with the reflective pixelated displays for analyzing image combiner and image projection lens assembly to combine the image information and project it, the improvement comprising:

a polarizing beam splitter having first and second reflective pixelated displays in physical contact with separate first and second sides of the polarizing beam splitter for imparting image information of respective first and second color components that are of different colors.

9. The projector of claim 8 in which the first and second sides are adjacent each other.

10. The projector of claim 8 further comprising only one other polarizing beam splitter having associated with it one of the reflective pixelated displays.

11. In a multi-path reflective pixelated display projector having a light source providing multi-color light, plural reflective pixelated displays for imparting image information on color components of the light, plural polarizing beam splitters associated with the reflective pixelated displays for analyzing image information imparted by the reflective pixelated displays, and a color component image combiner and image projection lens assembly to combine the image information and project it, the improvement comprising:

an illumination color component polarizer having a color selective mirror, a quarter wave plate, and another mirror that are in a fixed position and successively receive incident light for polarizing a color component of the multi-color light relative to another color component of the multi-color light; and a fixed color separating dichroic mirror that separates a selected color component of light from, and directs it along a path different from that of, another color component of light.

12. The projector of claim 11 in which the illumination color component polarizer polarizes only one color component of light.

13. The projector of claim 11 in which the illumination color component polarizer polarizes two color components of light.

14. In a multi-path transmissive pixelated display projector having a light source providing multi-color light, plural transmissive pixelated displays for imparting image information on color components of the light, plural polarizing beam splitters associated with the transmissive pixelated displays for analyzing image information imparted by the transmissive pixelated displays, and a color component image combiner and image projection lens assembly to combine the image information and project it, the improvement comprising:

an illumination color component polarizer having a color selective mirror, a quarter wave plate, and another mirror that are in a fixed position and successively receive incident light for polarizing a color component of the multi-color light relative to another color component of the multi-color light; and a fixed color separating dichroic mirror that separates a selected color component of light from, and directs it along a path different from that of, another color component of light.

15. The projector of claim 14 in which the illumination color component polarizer polarizes only one color component of light.

16. The projector of claim 14 in which the illumination color component polarizer polarizes two color components of light.

17. In a multi-path pixelated display projector having a light source providing three intermixed color components of a first polarization and three pixelated displays for imparting image information on the color components of light, the image information on the color components of light being combined and projected to form a display image, a method of directing the plural color components, comprising:

imparting on at least one or two of the color components a second polarization orthogonal to the first polarization to provide one color component with one of the first and second polarizations and two color components with the other of the first and second polarizations, the three color components being directed along a common optical path;

color separating one of the two color components having the other of the first and second polarizations and directing it along an optical path separate from that of the two other color components; and polarization separating the two other color components from each other after the color separation of the one color component.

18. The method of claim 17 in which polarization separating the the two other color components includes directing them through a polarizing beam splitter that separates light of the first and second polarizations.

19. The method of claim 17 in which the polarizing beam splitter includes a pair of prisms that have respective inclined faces positioned against each other with a dielectric film therebetween.

20. The method of claim 17 in which the three pixelated displays are transmissive displays.

21. The method of claim 20 in which the three pixelated displays are liquid crystal displays.

22. The method of claim 17 in which the three pixelated displays are reflective displays.

23. The method of claim 22 in which the three pixelated displays are liquid crystal displays.

24. In a multi-path reflective pixelated display projector having a light source providing multi-color light, plural reflective pixelated displays for imparting image information on color components of the light, plural polarizing beam splitters associated with the reflective pixelated displays for analyzing image information imparted by the reflective pixelated displays, and a color component image combiner and image projection lens assembly to combine the image information and project it, the improvement comprising:

a color separating dichroic mirror that separates at least two selected color components of light from another color component of light, the at least two selected color components of light having have a first polarization;

a color light separating polarizing beam splitter that receives the at least two selected color components of light and separates them from each other, the at least two selected color components of light having the same polarization and the polarizing beam splitter including a dielectric layer that separates the at least two selected color components of light according to their colors; and a quarter wave plate and an achromatic mirror that cooperate to impart on the other color component of light second polarization orthogonal to the first polarization.

25. The projector of claim 11 in which one of the color components of light is green light.

26. The projector of claim 24 in which the dielectric layer is achromatic to provide color non-selective reflection of light of a selected polarization.

27. The projector of claim 24 in which the at least two selected color components of light are directed along an optical path separate from the other color components of light.

28. The projector of claim 24 which the at least two selected color components of light and the other color components of light are directed along a common optical path.

29. The projector of claim 24 in which one of the separated selected color components is directed toward another of the polarizing beam splitters.

30. The projector of claim 24 in which the color light separating polarizing beam splitter delivers the separated selected color components of light directly to separate reflective liquid crystal displays.

31. The projector of claim 30 in which the separate reflective liquid crystal displays are positioned at adjacent faces of the color light separating polarizing beam splitter.

32. In a multi-path reflective pixelated display projector having a light source providing multi-color light, plural reflective pixelated displays for imparting image information on color components of the light, plural polarizing beam splitters associated with the reflective pixelated displays for analyzing image information imparted by the reflective pixelated displays, and a color component image combiner and image projection lens assembly to combine the image information and project it, the improvement comprising:

a color light separating polarizing beam splitter that receives at least two selected color components of light and separates them from each other, the selected color components of light having orthogonal polarizations and the polarizing beam splitter includes a dielectric layer that separates the selected color components of light according to their polarizations.

33. The projector of claim 32 in which one of the color components of light is green light.

34. The projector of claim 32 in which the dielectric layer is achromatic to provide color non-selective reflection of light of a selected polarization.

35. The projector of claim 32 further comprising a color separating dichroic mirror that separates the at least two selected color components of light from another color component of light and directs the at least two selected color components of light to the color light separating polarizing beam splitter.

36. The projector of claim 35 in which the at least two selected color components of light are directed along an optical path separate from the other color components of light.

37. The projector of claim 35 in which the two selected color components of light have a first polarization, the projector further comprising a quarter wave plate and an achromatic mirror that cooperate to impart on the other color component of light a second polarization orthogonal to the first polarization.

38. The projector of claim 37 in which the at least two selected color components of light and the other color components of light are directed along a common optical path.

39. The projector of claim 32 in which one of the separated selected color components is directed toward another of the polarizing beam splitters.

40. The projector of claim 32 in which the color light separating polarizing beam splitter delivers the separated selected color components of light directly to separate reflective liquid crystal displays.

41. The projector of claim 40 in which the separate reflective liquid crystal displays are positioned at adjacent faces of the color light separating polarizing beam splitter.

* * * * *